April 20, 1965 C. E. BLANK, SR 3,179,451
WRIST PIN ASSEMBLY
Filed Nov. 1, 1962

INVENTOR.
CHARLES E. BLANK, SR.
BY
Daniel W. Tibbott
ATTORNEY

3,179,451
WRIST PIN ASSEMBLY
Charles E. Blank, Sr., Painted Post, N.Y., assignor to Ingersoll-Rand Company, New York, N.Y., a corporation of New Jersey
Filed Nov. 1, 1962, Ser. No. 234,662
3 Claims. (Cl. 287—100)

This invention relates to a wrist pin assembly of the type used in reciprocating machinery such as internal combustion engines, compressors and pumps. This invention is particularly adapted for use in a crosshead connecting a piston rod to a connecting rod.

The U.S. patent issued to T. Warming, No. 3,011,812, shows a crosshead construction wherein a wrist pin is fixed to the eye end of a connecting rod and journaled in the side members of the bifurcated crosshead body. Journaling the wrist pin in the crosshead side members, instead of in the eye end of the connecting rod, provides a large amount of bearing area for the wrist pin, while allowing the wrist pin and the connecting rod eye end to be relatively small in diameter, in comparison with conventional crosshead construction. The present invention relates to this type of wrist pin assembly.

The wrist pin assembly disclosed in the above noted Warming patent has the disadvantage of being somewhat difficult to assemble properly and if it is not assembled properly, it may flex under load causing the wrist pin to loosen and wobble in the eye end of the connecting rod. Any slack or movement of the wrist pin in the eye end of the connecting rod is extremely undesirable for it causes the wrist pin assembly to rapidly wear out.

The principal object of this invention is to provide a wrist pin assembly which is easier and less laborious to assemble properly, which can be assembled by relatively unskilled labor and which is less likely to wobble in the eye end of the connecting rod when under load.

Other important objects include the following: to provide a wrist pin assembly wherein the wrist pin can be easily mounted in the eye end of the connecting rod under a predetermined stress load; and to provide a wrist pin assembly which can be properly assembled without the use of special tools.

Figure 1:
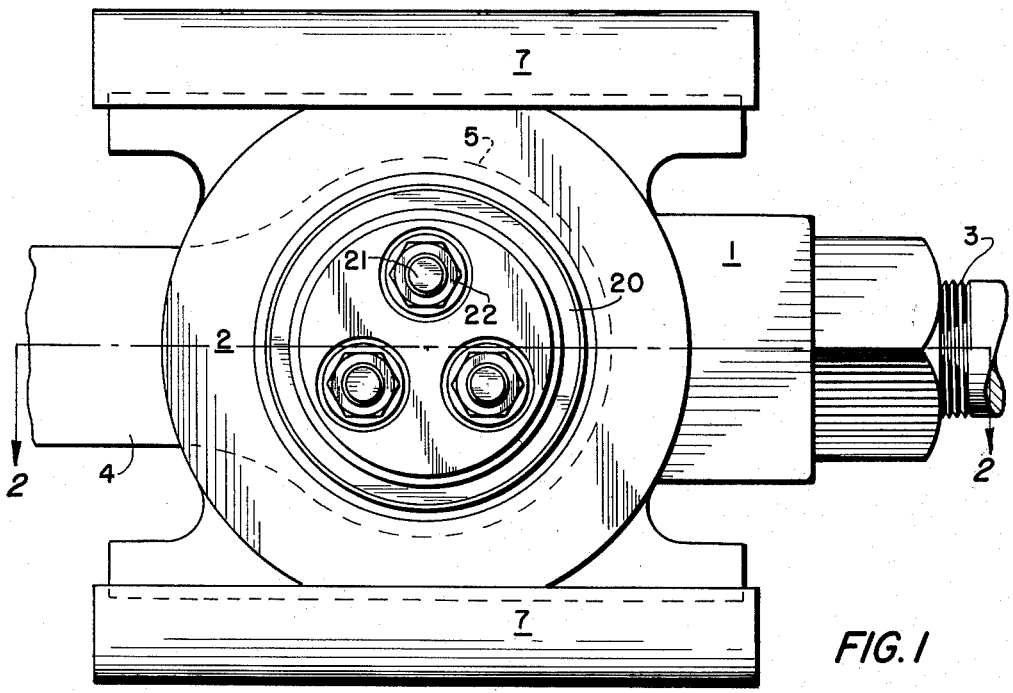
Figure 2:
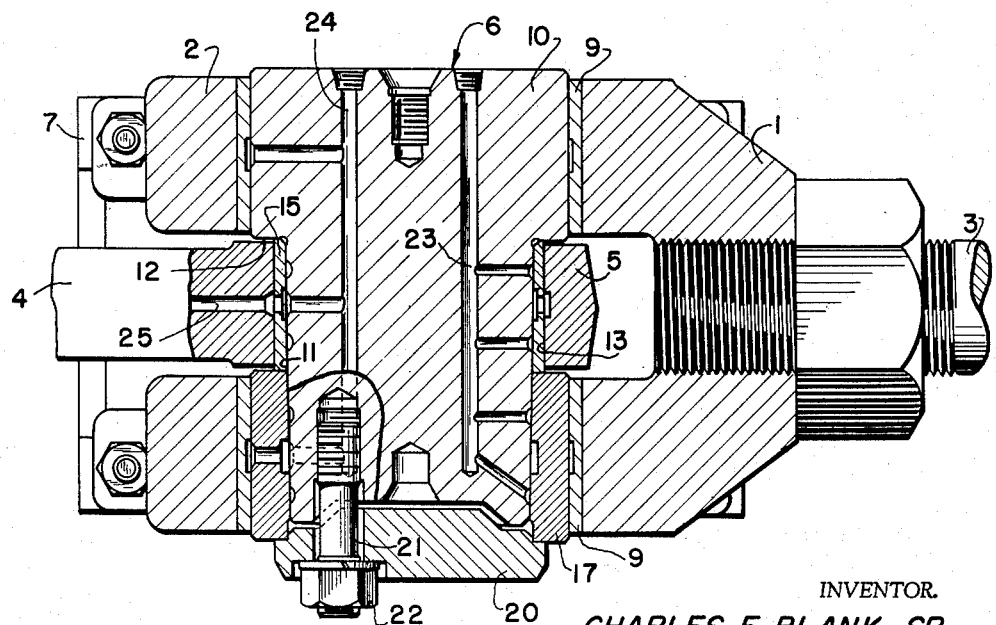

This invention is described in connection with the accompanying drawing wherein:

FIG. 1 is a side elevational view of a crosshead containing the wrist pin assembly of this invention; and FIG. 2 is a horizontal section taken on line 2—2 of FIG. 1 with portions broken away.

The crosshead assembly shown in the drawing is conventional in its outward appearance and broadly includes: a bifurcated crosshead body 1 having a pair of spaced sides 2 interconnected by a bight, also designated 1; an end of a piston rod 3 fixed to the crosshead bight 1; a connecting rod 4 having an eye end 5 located between the crosshead sides 2; a wrist pin 6 extending through the crosshead sides 2 and the connecting rod eye end 5; and a pair of crosshead slides 7 mounted on the top and bottom of the crosshead body 1 adapted to slide in conventional crosshead guides (not shown) for holding the crosshead 1 in a straight reciprocating travel path. The foregoing structure is commonly found in conventional crossheads used for interconnecting the cranks of compressors, engines or pumps to reciprocating pistons.

The invention in the arrangement disclosed in the drawing lies in the novel manner that the wrist pin 6 is mounted in the crosshead 1 and the connecting rod eye end 5.

Each side 2 of the crosshead 1 includes a cylinderical bushing 9 which is press-fitted into a corresponding hole in the crosshead side 2. Both of the bushings 9 are axially aligned with each other. The wrist pin 6 includes a large cylindrical head portion 10, a tapered shank 11 extending outwardly axially from the head portion 10 and an annular shoulder 12 interconnecting the tapered surface of the shank 11 with the cylindrical circumference of the head portion 10. The connecting rod eye end 5 includes a cylindrical bore 13. In the assembled position of the wrist pin 6, as shown in FIG. 2, the head portion 10 is rotatively journaled in one of the bushings 9 and the tapered shank 11 of the wrist pin 6 extends through the bore 13 of the connecting rod eye end 5 and the other bushing 9 which is remote from the head portion 10 of the wrist pin.

The wrist pin 6 is locked or fixed to the connecting rod eye end 5 by means of a tapered sleeve 15 fitting on the tapered shank 11 of the wrist pin 6 and disposed within the bore 13 in the connecting rod eye end 5. The interior of the sleeve 15 is tapered to correspond with the taper of the tapered shank 11 and the exterior of the sleeve is cylindrical to fit in the cylindrical bore 13. The tapered sleeve 15 is press fitted into the bore 13 to provide a metal-to-metal fit before the connecting rod 4 is assembled with the crosshead 1. In addition, the tapered sleeve 15 is slightly wider than the connecting rod eye end 5 so that it projects beyond it slightly at both ends of the bore 13. The interior dimensions of the tapered sleeve 15 are selected so that when it is pressed or pulled into place on the tapered shank 11 it will apply a predetermined tensional stress load on the eye end 5 of the connecting rod 4. This predetermined stress load is reached when the tapered sleeve 15 is pressed axially to a position wherein its adjacent end abuts the annular shoulder 12 on the wrist pin 6. Normally, this predetermined stress load is selected to be higher than the stress load which will be applied to the connecting rod eye end 5 during operation of the crosshead so that the operational stresses will not cause the wrist pin 6 to loosen in the connecting rod eye end 5.

The wrist pin 6 is pulled axially into position in the first tapered sleeve 15, in the connecting rod eye end 5, by a second tapered sleeve 17 which fits over the outward portion of the tapered shank 11 and carries a cylindrical circumference which is journaled in one of the crosshead side bushings 9.

The second tapered sleeve 17 is forced axially into position on the wrist pin 6 by a cap 20 which abuts it outer end edge and fits over a group of threaded studs 21 mounted in the end of the tapered shank 11 of the wrist pin. Conventional nuts 22 are threaded on the studs 21 and abut the cap 20. Although the drawing shows three studs 21, this number may be increased when it is necessary to provide a more uniform axial thrust to the cap 20.

The foregoing crosshead construction is assembled in the following steps.

(1) The bushings 9 are pressed into the crosshead sides 2 and machined internally to size;

(2) The first tapered sleeve 15 is pressed into the connecting rod eye end 5 and machined internally to provide the proper tapered interior;

(3) The connecting rod eye end 5 is located between the crosshead sides 2 with the bushings 9 and tapered sleeve 15 being axially aligned;

(4) The wrist pin 6 is inserted axially into position with its head portion 10 resting in one of the bushings 9 and its tapered shank 11 extending through the first tapered sleeve 15 and the other bushing 9;

(5) The second tapered sleeve 17 is inserted axially within the other bushing 9 and over the tapered shank 11;

(6) The cap 20 is placed over the studs 21 and the nuts 22 are threaded on the studs 21 over the cap 20;

(7) The nuts 22 are tightened until the first tapered sleeve 15 is pulled axially against the annular shoulder 12 whereupon the eye end 5 of the connecting rod 4 is stressed to the desired and predetermined value.

FIG. 2 shows a plurality of passages 23 provided in the wrist pin 6. These passages 23 are adapted to receive hydraulic pressure for aid in disassembling the wrist pin assembly. During the operation of the crosshead, the passages 23 are not used and are preferably plugged to prevent dust from entering them.

FIG. 2 also shows another set of passages 24 in the wrist pin 6 adapted for receiving lubricating oil from the passage 25 in the connecting rod 4 and conveying the oil to the bearing surfaces of the bushings 9.

Although a preferred embodiment is shown and described in detail, it will be understood that the invention is not limited merely to this embodiment but contemplates other embodiments and variations which utilize the concepts and teachings of this invention.

Having described by invention, I claim:

1. A wrist pin assembly comprising:
    (a) a bifurcated member having a pair of spaced sides;
    (b) a connecting rod having an eye end containing a bore located between said spaced sides;
    (c) a wrist pin extending through said spaced sides and said bore and rotatably mounted in said spaced sides;
    (d) a tapered sleeve surrounding said wrist pin and disposed within said bore to lock said wrist pin firmly within said bore and prevent it from moving in said bore when said wrist pin assembly is transmitting a load;
    (e) said tapered sleeve being tapered on its interior and said wrist pin being tapered to cooperate with said tapered sleeve to apply a tensional stress to said eye end of said connecting rod;
    (f) said wrist pin including a shoulder intermediate the ends of said pin and adapted to abut one end of said tapered sleeve for limiting the axial distance that said sleeve can be forced onto said wrist pin and thereby limiting the magnitude of the stress load which is applied to the connecting rod eye end by the wrist pin assembly; and
    (g) means on said pin engaging the other end of said tapered sleeve and forcing said tapered sleeve axially along said wrist pin into engagement with said shoulder for holding it in assembled position on the wrist pin.

2. The wrist pin assembly of claim 1 wherein:
    (a) said wrist pin is rotatively mounted in cylindrical openings in said sides of the bifurcated member;
    (b) and said means for forcing said tapered sleeve axially along said wrist pin includes a second tapered sleeve abutting the other end of the first tapered sleeve and having a cylindrical exterior periphery rotatably disposed within one of said cylindrical openings in the sides of said bifurcated member.

3. The wrist pin assembly of claim 2 including:
    (a) threaded means at one end of said wrist pin for applying an axial thrust against said second sleeve.

References Cited by the Examiner

UNITED STATES PATENTS

| | | | |
|---|---|---|---|
| 1,153,986 | 9/15 | Whitney | 287—100 |
| 1,303,728 | 5/19 | Rogatchoff | 287—96 |
| 1,684,862 | 9/28 | Gay | 287—20 |
| 1,789,326 | 1/31 | Tollerton et al. | 287—100 X |
| 3,011,812 | 12/61 | Warming | 287—100 |

CARL W. TOMLIN, *Primary Examiner.*